(12) United States Patent
Kawahara et al.

(10) Patent No.: US 7,825,179 B2
(45) Date of Patent: Nov. 2, 2010

(54) BIODEGRADABLE RESIN COMPOSITION, PRODUCTION METHOD THEREFOR, AND PRODUCT MOLDED OR FORMED THEREFROM

(75) Inventors: Mitsuhiro Kawahara, Uji (JP); Miho Nakai, Uji (JP); Kazue Ueda, Uji (JP); Akinobu Ogami, Osaka (JP)

(73) Assignee: Unitika Ltd., Hyogo (JP)

( * ) Notice: Subject to any disclaimer, the term of this patent is extended or adjusted under 35 U.S.C. 154(b) by 88 days.

(21) Appl. No.: 11/992,437

(22) PCT Filed: Oct. 4, 2006

(86) PCT No.: PCT/JP2006/319851

§ 371 (c)(1),
(2), (4) Date: Mar. 18, 2008

(87) PCT Pub. No.: WO2007/040243

PCT Pub. Date: Apr. 12, 2007

(65) Prior Publication Data

US 2009/0298977 A1    Dec. 3, 2009

(30) Foreign Application Priority Data

| Oct. 5, 2005 | (JP) | ............................... 2005-293063 |
| Dec. 21, 2005 | (JP) | ............................... 2005-367294 |
| Dec. 21, 2005 | (JP) | ............................... 2005-367295 |

(51) Int. Cl.
  *C08K 5/09*   (2006.01)

(52) U.S. Cl. ............... 524/322; 523/124; 524/140; 524/147; 524/275; 524/442; 524/445; 524/599

(58) Field of Classification Search ............... 523/124; 524/140, 275, 277, 442, 599, 99, 106, 147, 524/195, 196, 322, 445
See application file for complete search history.

(56) References Cited

U.S. PATENT DOCUMENTS

| 5,955,529 | A   | * | 9/1999 | Imai et al. .................... 524/417 |
| 7,084,192 | B2  | * | 8/2006 | Ouchi et al. ................. 523/205 |
| 7,285,589 | B2  | * | 10/2007 | Fujihira et al. .............. 524/442 |
| 2004/0054051 | A1 |   | 3/2004 | Ouchi et al. |
| 2005/0014871 | A1 | * | 1/2005 | Chin ........................... 524/99 |

FOREIGN PATENT DOCUMENTS

| CA | 2 313 192 |   | 6/1999 |
| CN | 1281482 |   | 1/2001 |
| CN | 1436812 |   | 8/2003 |
| JP | 9-100395 |   | 4/1997 |
| JP | 2002-179899 |   | 6/2002 |
| JP | 2002179899 | A * | 6/2002 |
| JP | 2003-82212 |   | 3/2003 |
| JP | 2003-183934 |   | 7/2003 |
| JP | 2003-261756 |   | 9/2003 |
| JP | 2003261756 | * | 9/2003 |
| JP | 2004-67989 |   | 3/2004 |
| JP | 2004-352844 |   | 12/2004 |
| JP | 2005060474 | * | 3/2005 |
| WO | 2006/118096 |   | 11/2006 |

* cited by examiner

*Primary Examiner*—David Wu
*Assistant Examiner*—Marie Reddick
(74) *Attorney, Agent, or Firm*—Fildes & Outland, P.C.

(57) ABSTRACT

A biodegradable resin composition is provided, which is highly transparent with little agglomeration. The biodegradable resin composition comprises a biodegradable polyester resin, a phyllosilicate, and at least one of a polyether phosphate compound, a polar wax and jojoba oil.

10 Claims, No Drawings

US 7,825,179 B2

BIODEGRADABLE RESIN COMPOSITION, PRODUCTION METHOD THEREFOR, AND PRODUCT MOLDED OR FORMED THEREFROM

TECHNICAL FIELD

The present invention relates to a biodegradable resin composition, a production method therefor, and a product molded or formed therefrom.

BACKGROUND ART

In recent years, biodegradable resins typified by polylactic acid have come into focus from the viewpoint of environmental preservation. The polylactic acid is one of the most heat-resistant and highly transparent biodegradable resins, and is mass-producible from a material derived from plants such as corn and sweet potato. Therefore, the polylactic acid is less expensive. Further, the polylactic acid is carbon-neutral, thereby contributing to reduction in environmental load. Thus, the polylactic acid is very useful.

However, products molded from the biodegradable resin alone are generally insufficient in strength. A known method for improving the strength is to disperse an inorganic filler such as talc or a phyllosilicate in the biodegradable resin. However, addition of the talc reduces the transparency of the product, and addition of a larger amount of the phyllosilicate deteriorates the appearance of the product due to agglomeration of the phyllosilicate. Therefore, the addition of the talc or the phyllosilicate is disadvantageous for production of containers, sheets and films.

To solve this problem, a method for increasing the dispersibility is disclosed in JP-A-2004-027136, in which the polylactic acid and a phyllosilicate preliminarily swelled with water or an aqueous solvent are kneaded at a temperature not higher than the melting point of the polylactic acid. In JP-A-2004-204143, a method for improving the transparency is disclosed, in which a biodegradable resin containing hectorite or saponite is kneaded under specific conditions. In JP-A-2004-323758, a method for improving the dispersibility is disclosed, which employs a phyllosilicate having an interlayer distance increased by intercalation of a lactide or a lower molecular weight polylactic acid having a number average molecular weight not greater than 50,000.

DISCLOSURE OF THE INVENTION

Problems to be Solved by the Invention

However, the method disclosed in JP-A-2004-027136 is economically disadvantageous with a need for a special kneader, and is liable to reduce the molecular weight of the resin composition during the kneading, thereby leading to thermal degradation of the resin composition during molding. The method disclosed in JP-A-2004-204143 is disadvantageous in that, if the resin composition is heavily kneaded to suppress the agglomeration of the filler, deterioration of the resin composition and re-agglomeration of the filler are liable to occur to impair the transparency and the moldability. The method disclosed in JP-A-2004-323758 still requires improvement in dispersibility.

To solve the aforementioned problems, it is an object of the present invention to provide a biodegradable resin composition which is highly transparent with little agglomeration.

Means for Solving the Problems

The inventors of the present invention have found that, where a phyllosilicate and at least one of a polyether phosphate compound, a polar wax and jojoba oil are added to a biodegradable polyester resin, the dispersibility of the phyllosilicate and the transparency of the resulting resin composition are improved, and attained the present invention.

The present invention has the following features.

(1) A biodegradable resin composition comprising a biodegradable polyester resin, a phyllosilicate, and at least one of a polyether phosphate compound, a polar wax and jojoba oil.

(2) The biodegradable resin composition of (1) comprising 100 parts by mass of a biodegradable polyester resin including not less than 50% by mass of a polylactic acid, 0.1 to 10 parts by mass of the phyllosilicate, and 0.1 to 10 parts by mass of the polyether phosphate compound.

(3) The biodegradable resin composition of (2) having a haze not higher than 35% as measured on a 1-mm thick piece molded from the biodegradable resin composition.

(4) The biodegradable resin composition of (1) comprising a biodegradable polyester resin including one of an α- and/or β-hydroxycarboxylic acid unit and an ω-hydroxyalkanoate unit as a major component thereof, the phyllosilicate and the polar wax.

(5) The biodegradable resin composition of (4), wherein the polar wax is present in a proportion of 0.1 to 15 parts by mass based on 100 parts by mass of the biodegradable polyester resin.

(6) The biodegradable resin composition of (4) or (5) having a haze not higher than 60% as measured on a 1-mm thick piece molded from the biodegradable resin composition, and having an oxygen permeation coefficient not greater than 150 ml·mm/m²·day·MPa as measured at a temperature of 20° C. at a relative humidity of 90%.

(7) The biodegradable resin composition of (1) comprising a biodegradable polyester resin comprising one of an α- and/or β-hydroxycarboxylic acid unit and an ω-hydroxyalkanoate unit as a major component thereof, the phyllosilicate and the jojoba oil.

(8) The biodegradable resin composition of (7), wherein the jojoba oil is present in a proportion of 0.1 to 15 parts by mass based on 100 parts by mass of the biodegradable polyester resin.

(9) The biodegradable resin composition of (7) or (8) having a haze not higher than 40% as measured on a 1-mm thick piece molded from the biodegradable resin composition, and having an oxygen permeation coefficient not greater than 150 ml·mm/m²·day·MPa as measured at a temperature of 20° C. at a relative humidity of 90%.

(10) The biodegradable resin compositions of any one of (4) to (9), the biodegradable polyester resin comprises not less than 50% by mass of a polylactic acid.

(11) The biodegradable resin compositions of any one of (4) to (10), the phyllosilicate is present in a proportion of 0.5 to 10 parts by mass based on 100 parts by mass of the biodegradable polyester resin.

(12) The biodegradable resin compositions of any one of (1) to (11), the phyllosilicate contains an ion bonded between layers thereof, the ion being at least one type of ion selected from the group consisting of primary to quaternary ammonium, pyridinium, imidazolium and phosphonium ions.

(13) The biodegradable resin compositions of any one of (1) to (12) each further comprising 0.1 to 5 parts by mass of at least one compound selected from the group consisting of a carbodiimide compound, an epoxy compound, an isocyanate compound and an oxazoline compound based on 100 parts by mass of the biodegradable polyester resin.

(14) The biodegradable resin compositions of any one of (1) to (13) each further comprising 0.1 to 5 parts by mass of at least one of a phosphite compound and a phosphonite compound based on 100 parts by mass of the biodegradable polyester resin.

(15) A production method for any of the biodegradable resin compositions of (1) to (14) comprising the step of adding the phyllosilicate; and at least one of a polyether phosphate compound, a polar wax and jojoba oil to the biodegradable polyester resin during melt-kneading or molding.

(16) A product molded or formed from any of the biodegradable resin compositions of (1) to (14).

EFFECTS OF THE INVENTION

According to the present invention, the biodegradable resin composition, which comprises the biodegradable polyester resin, the phyllosilicate, and at least one of the polyether phosphate compound, the polar wax and the jojoba oil, is highly transparent with improved phyllosilicate dispersibility and little agglomeration. The resin composition is molded or formed into a variety of products for use in a variety of applications. In addition, the inventive resin composition is biodegradable and, therefore, is compostible when being discarded, making it possible to reduce the amount of garbage and to recycle the resulting compost as fertilizer.

BEST MODE FOR CARRYING OUT THE INVENTION

A biodegradable resin composition according to the present invention contains a biodegradable polyester resin.

According to a first embodiment of the present invention, there is provided a biodegradable resin composition which contains 100 parts by mass of a biodegradable polyester resin containing not less than 50% by mass of a polylactic acid, 0.1 to 10 parts by mass of a phyllosilicate, and 0.1 to 10 parts by mass of a polyether phosphate compound. In the resin composition, the biodegradable polyester resin should contain the polylactic acid in a proportion of not less than 50% by mass. The proportion of the polylactic acid is preferably not less than 60% by mass, more preferably not less than 80% by mass. If the proportion of a biodegradable resin other than the polylactic acid is greater than 50% by mass, the resulting biodegradable resin composition is unsatisfactory in mechanical properties and transparency.

Examples of the polylactic acid include poly(L-lactic acid), poly(D-lactic acid), a mixture of the poly(L-lactic acid) and the poly(D-lactic acid), a copolymer of the poly(L-lactic acid) and the poly(D-lactic acid), and a stereo complex of the poly(L-lactic acid) and the poly(D-lactic acid). The polylactic acid is prepared by employing a known melt polymerization method, optionally, in combination with a solid phase polymerization method. Where a plant-based material is employed as a material for the polylactic acid, the consumption of petroleum resources will be reduced.

Examples of the biodegradable polyester resin other than the polylactic acid include: aliphatic polyesters typified by poly(ethylene succinate), poly(butylene succinate), poly(butylene succinate-co-butylene adipate) which are each prepared from a diol and a dicarboxylic acid; polyhydroxycarboxylic acids such as polyglycolic acid, poly(3-hydroxybutyric acid), poly(3-hydroxyvaleric acid) and poly (3-hydroxycaproic acid); poly(ω-hydroxyalkanoates) typified by poly(ε-caprolactone) and poly(δ-valerolactone) polyesters such as poly(butylene succinate-co-butylene terephthalate) and poly(butylene adipate-co-butylene terephthalate) which each contain an aromatic component but are biodegradable; polyester amides; and polyester carbonates. These resins may be used alone, or two or more of these resins may be used in combination, or mixed or copolymerized with each other.

A dicarboxylic acid, a diol or a hydroxycarboxylic acid may be copolymerized with the biodegradable polyester resin, as long as the biodegradability is not impaired.

Examples of the dicarboxylic acid include aliphatic dicarboxylic acids such as oxalic acid, succinic acid, glutaric acid, adipic acid, pimelic acid, suberic acid, azelaic acid, sebacic acid, undecane dicarboxylic acid, dodecane dicarboxylic acid, octadecane dicarboxylic acid, cyclohexane dicarboxylic acid, phthalic acid, terephthalic acid, isophthalic acid, o-phthalic acid, chlorophthalic acid, nitrophthalic acid, maleic acid, fumaric acid, and dimer acids and hydrogenated dimer acids each having 20 to 45 carbon atoms; alicyclic dicarboxylic acids such as 1,4-cyclohexane dicarboxylic acid; and aromatic dicarboxylic acids such as 2,5-naphthalene dicarboxylic acid, 2,6-naphthalene dicarboxylic acid, 2,7-naphthalene dicarboxylic acid, 1,5-naphthalene dicarboxylic acid, methylterephthalic acid, 4,4'-biphenyl dicarboxylic acid, 2,2'-biphenyl dicarboxylic acid, 4,4'-diphenyl ether dicarboxylic acid, 4,4'-diphenylmethane dicarboxylic acid, 4,4'-diphenyl sulfone dicarboxylic acid, 4,4'-diphenylisopropylidene dicarboxylic acid, 1,2-bis(4-carboxyphenoxy)ethane and 5-sodiumsulfoisophthalatic acid.

Examples of the diol include ethylene glycol, propylene glycol, 1,3-propanediol, 2,2-dimethyl-1,3-propanediol, 2,2-diethyl-1,3-propanediol, 2,2-dibutyl-1,3-propanediol, 1,2-butanediol, 1,3-butanediol, 1,4-butanediol, 1,5-pentanediol, 1,2-pentanediol, 1,3-pentanediol, 2,3-pentanediol, 2,4-pentanediol, 2-methyl-2,4-pentanediol, 1,4-pentanediol, 1,6-hexanediol, 1,2-hexanediol, 1,3-hexanediol, 1,4-hexanediol, 1,5-hexanediol, 1,7-heptanediol, 1,8-octanediol, 1,9-nonanediol, 1,10-decanediol, 1,11-undecanediol, 1,12-dodecanediol, 1,4-cyclohexane dimethanol, 1,3-cyclohexane dimethanol, 1,2-cyclohexane dimethanol, n-butoxyethylene glycol, hydrogenated bisphenol A, neopentyl glycol, dimer diols, diethylene glycol, dipropylene glycol, triethylene glycol, trimethylene glycol, tetramethylene glycol, pentamethylene glycol, octamethylene glycol, polyethylene glycol, polypropylene glycol, polytetramethylene glycol, hydroquinone, resorcinol, bisphenol A, 2,2-bis(2'-hydroxyethoxyphenyl)propane, xylylene glycol, and phenylethylene glycol.

Examples of the hydroxycarboxylic acid include glycolic acid, lactic acid, 3-hydroxybutyric acid, 4-hydroxybutyric acid, 4-hydroxyvaleric acid, 5-hydroxyvaleric acid, 6-hydroxycaproic acid, and aromatic hydroxycarboxylic acids such as p-hydroxybenzoic acid, p-hydroxyethoxybenzoic acid, 6-hydroxy-2-naphthoic acid and 4'-hydroxybiphenyl-4-carboxylic acid. Where these comonomers have asymmetric carbons, the comonomers may each be a levorotary compound, a dextrorotary compound, a mixture of the levorotary compound and the dextrorotary compound, or a racemic compound.

In terms of transparency, it is preferred to employ succinic acid, adipic acid or any of dimer acids and hydrogenated dimer acids having 20 to 45 carbon atoms as the dicarboxylic acid, and to employ ethylene glycol, diethylene glycol, triethylene glycol, propylene glycol, 1,3-propanediol or 1,4-butanediol as the diol among the comonomers described above.

According to a second embodiment of the present invention, there is provided a biodegradable resin composition which contains a biodegradable polyester resin having one of an α- and/or β-hydroxycarboxylic acid unit and an ω-hydroxyalkanoate unit as a major component thereof, a phyllosilicate, and a polar wax and/or jojoba oil.

Examples of the α- and/or β-hydroxycarboxylic acid unit include D-lactic acid, L-lactic acid, a mixture of D-lactic acid and L-lactic acid, glycolic acid, 3-hydroxybutyric acid, 3-hydroxyvaleric acid, 3-hydroxycaproic acid, and a mixture and a copolymer of any of these hydroxycarboxylic acids, among which D-lactic acid and L-lactic acid are particularly preferred. Examples of the ω-hydroxyalkanoate unit include ε-caprolactone and δ-valerolactone. As in the aforementioned case, an aromatic dicarboxylic acid such as terephthalic acid or isophthalic acid may be copolymerized with the biodegradable polyester resin, as long as the biodegradability of the polyester resin is not impaired. The resulting polyester copolymer also falls within the category of the biodegradable polyester resin according to the invention.

Examples of the biodegradable polyester resin include poly(D-lactic acid) and poly(L-lactic acid) as well as polyglycolic acid, poly(3-hydroxybutyric acid) poly(3-hydroxyvaleric acid), and poly(ω-hydroxyalkanoates) typified by poly (ε-caprolactone) and poly(δ-valerolactone). These compounds may be used alone, or two or more of these compounds may be used in combination, or mixed or copolymerized with each other. The content ratio of L-lactic acid and D-lactic acid in the polylactic acid is not particularly limited, but commercially available polylactic acids are advantageously employed which typically have a molar ratio of (L-lactic acid/D-lactic acid)=80/20 to 99.8/0.2. The polylactic acid may be in the form of a stereo-complex.

In the second embodiment, a material containing not less than 50% by mass of the polylactic acid is preferably employed, because the resulting composition contains a higher proportion of a plant-based material and therefore highly environmentally friendly. In addition, the transparency and the heat resistance of the composition are well-balanced. The proportion of the polylactic acid is preferably not less than 60% by mass, more preferably not less than 80% by mass. If the biodegradable resin other than the polylactic acid is present in a proportion of greater than 50% by mass, the resulting biodegradable resin composition is insufficient in mechanical properties, transparency and heat resistance though containing the polylactic acid. If a plant-based material such as natural rubber or nylon 11 other than the polylactic acid is employed in a greater proportion, the proportion of the plant-based resins in the composition is increased, leading to significant reduction in the consumption of the petroleum resources.

These resins may be partly crosslinked.

The biodegradable polyester resin is produced by employing a known melt-polymerization method, optionally, in combination with a solid phase polymerization method. Poly(3-hydroxylbutyric acid) and poly(3-hydroxyvaleric acid) may be microbially produced.

The molecular weight of the biodegradable polyester resin is not particularly limited, but the biodegradable polyester resin preferably has a melt flow rate (MFR which is an indication of the molecular weight) of 0.1 to 50 g/10 minutes, more preferably 0.2 to 40 g/10 minutes, at 190° C. with 21.2 N for advantageous use.

The phyllosilicate employed in the first and second embodiments is one type of swellable lamellar clay mineral. Specific examples of the phyllosilicate include smectites, vermiculites and swellable fluorinated mica. Examples of the smectites include montmorillonite, beidellite, hectorite and saponite. Examples of the swellable fluorinated mica include Na-type tetrasilicon fluoride mica, Na-type taeniolite and Li-type taeniolite. Other usable examples include phyllosilicates such as canemite, macatite, magadiite and kenyaite which contain neither aluminum nor magnesium. Among these phyllosilicates, the montmorillonite and the swellable fluorinated mica are preferred. The phyllosilicate may be natural or synthetic. Exemplary synthesizing methods include a melting method, an intercalation method and a hydrothermal synthesis method, and any of these methods may be employed. Any of these phyllosilicates may be used alone, or phyllosilicates of different types, different production sites and different particle diameters may be used in combination.

In order to improve the dispersibility of the phyllosilicate in the biodegradable polyester resin for further improvement of the transparency, the phyllosilicate preferably contains ions of primary to quaternary ammonium, pyridinium, imidazolium or phosphonium bonded between layers thereof.

The primary to tertiary ammonium ions are prepared by protonizing corresponding primary to tertiary amines. Examples of the primary amine include octylamine, dodecylamine and octadecylamine. Examples of the secondary amine include dioctylamine, methyloctadecylamine and dioctadecylamine. Examples of the tertiary amine include trioctylamine, dimethyldodecylamine and didodecylmonomethylamine. Examples of the quaternary ammonium include dihydroxyethylmethyloctadecylammonium, tetraethylammonium, octadecyltrimethylammonium, dimethyldioctadecylammonium, hydroxyethyldimethyloctadecylammonium, hydroxyethyldimethyldodecylammonium, benzyldihydroxyethyldodecylammonium, benzyldihydroxyethyloctadecylammonium, dodecyl(dihydroxyethyl)methylammonium, octadecyl(dihydroxyethyl)methylammonium, N,N-bis (2-hydroxyethyl)-N-(3'-dodecyloxy-2'-hydroxypropyl) methylammonium, methyldodecylbis(polyethyleneglycol) ammonium and methyldiethyl(polypropyleneglycol) ammonium. Examples of the phosphonium include tetraethylphosphonium, tetrabutylphosphonium, hexadecylbutylphosphonium, tetrakis(hydroxymethyl)phosphonium and 2-hydroxyethyltriphenylphosphonium. A phyllosilicate treated with ions of an ammonium or a phosphonium, such as dihydroxyethylmethyloctadecylammonium, hydroxyethyldimethyloctadecylammonium, hydroxyethyldimethyldodecylammonium, dodecyl(dihydroxyethyl)methylammonium, octadecyl(dihydroxyethyl)methylammonium, N,N-bis (2-hydroxyethyl)-N-(3'-dodecyloxy-2'-hydroxypropyl) methylammonium, methyldodecylbis(polyethyleneglycol) ammonium, methyldiethyl(polypropyleneglycol)ammonium or 2-hydroxyethyltriphenylphosphonium, which contains at least one hydroxyl group in its molecule is particularly preferred because of its strong affinity for the biodegradable polyester resin and its improved dispersibility. These ionic compounds may be used either alone or in combination.

A method of treating the phyllosilicate with ions of any of the primary to quaternary ammoniums and the phosphonium is not particularly limited. For example, the treatment may be achieved by dispersing the phyllosilicate in water or an alcohol, adding any of the primary to tertiary amines and an acid (e.g., hydrochloric acid) or adding a salt of the quaternary ammonium or the phosphonium, stirring the resulting mixture to ion-exchange interlayer inorganic ions of the phyllosilicate with the ammonium ions or the phosphonium ions, and filtering, rinsing and drying the resulting product.

In the first embodiment, the amount of the phyllosilicate to be blended should be 0.1 to 10 parts by mass based on 100 parts by mass of the biodegradable polyester resin. In the second embodiment, the amount of the phyllosilicate to be blended is preferably 0.5 to 10 parts by mass, more preferably 0.5 to 8 parts by mass, further more preferably 2 to 5 parts by mass. If the amount of the phyllosilicate is less than 0.1 part by mass in the first embodiment and less than 0.5 parts by mass in the second embodiment, it is difficult to practically improve the mechanical properties of a product molded from the resulting resin composition. If the amount of the phyllosilicate is greater than 10 parts by mass, the resulting resin composition tends to suffer from reduction in transparency and moldability.

Examples of the polyether phosphate compound to be employed in the first embodiment include monophosphates and diphosphates of a compound having a main chain of polyoxyalkylene such as polyoxyethylene, polyoxypropylene, polyoxybutylene, polyoxyethylene-polyoxypropylene, polyoxyethylene-polyoxybutylene, polyoxypropylene-polyoxybutylene or polyoxyethylene-polyoxypropylene-polyoxybutylene, and metal salts, ammonium salts, amine salts, alkanolamine salts of these phosphates. The polyether phosphate compound preferably has a number average molecular weight of 1,000 to 100,000.

The aforementioned polyether phosphate compounds may each have at least one of substituents including a hydrocarbon group, an ester-bonded group, an epoxy group, an amino group, a carboxyl group, a carbonyl group, an amide group, a hydroxyl group, a halogen atom, a phosphate group, a sulfonyl group present at its side or main chain. The polyether phosphate compounds may be used either alone or in combination.

In the present invention, particularly preferred examples of the polyether phosphate compound are compounds represented by the following general formulae (i) and (ii):

R—O(CH$_2$CH$_2$O)$_n$—PO(OH)$_2$    (i)

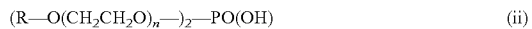

(R—O(CH$_2$CH$_2$O)$_n$—)$_2$—PO(OH)    (ii)

Wherein R is a C$_4$-C$_{20}$ alkyl group, a C$_6$-C$_{20}$ alkyl aryl group or a C$_6$-C$_{20}$ alkylphenoxy group.

The C$_4$-C$_{20}$ alkyl group represented by R is preferably a C$_8$-C$_{16}$ alkyl group. Specific examples of the C$_4$-C$_{20}$ alkyl group include an octyl group, a decyl group, a dodecyl group, a myristyl group, a cetyl group and a 2-ethyl-hexyl group.

The C$_6$-C$_{20}$ alkyl aryl group represented by R is preferably a C$_{14}$-C$_{18}$ alkyl aryl group. Specific examples of the C$_6$-C$_{20}$ alkyl aryl group include an octylphenyl group, a decylphenyl group and a dodecylphenyl group.

The C$_6$-C$_{20}$ alkylphenoxy group represented by R is preferably a C$_{14}$-C$_{18}$ alkylphenoxy group. Specific examples of the C$_6$-C$_{20}$ alkylphenoxy group include an octylphenoxy group, a decylphenoxy group and a laurylphenoxy group.

The group represented by R may further have a substituent.

The number n is an integer of 1 to 50, preferably 6 to 20.

A commercially available polyether phosphate compound may be used. Specific examples of the commercially available polyether phosphate compound represented by the formulae (i) and (ii) include DISPARLON DA375 available from Kusumoto Chemicals, Ltd., PLYSURF A215C available from Daiichi Kogyo Seiyaku Co., Ltd., PLYSURF A217E available from Daiichi Kogyo Seiyaku Co., Ltd., NEOSCORE CM57 available from Toho Chemical Industry Co., Ltd., and ADEKA COL TS and ADEKA COL CS available from Adeka Corporation.

The amount of the polyether phosphate compound to be added should be 0.1 to 10 parts by mass, preferably 0.2 to 5 parts by mass, based on 100 parts by mass of the biodegradable polyester resin. If the amount of the polyether phosphate compound is less than 0.1 part by mass, it is impossible to provide intended transparency because the effect of suppressing agglomeration of the phyllosilicate by properly dispersing the phyllosilicate is poor. Addition of the polyether phosphate compound in an amount greater than 10 parts by mass is not effective, because the mechanical properties of a product produced from the resulting resin composition are reduced.

The mass ratio between the phyllosilicate and the polyether phosphate compound in the resin composition is preferably (phyllosilicate)/(polyether phosphate compound)=1/0.01 to 1/20, more preferably 1/0.1 to 1/10.

In the second embodiment, the polar wax may be a natural wax or a synthetic wax. Examples of the natural wax include petroleum waxes, montan waxes, animal waxes and plant waxes. The petroleum waxes are those except for nonpolar waxes such as paraffin waxes and micro waxes each mainly having a saturated aliphatic hydrocarbon structure. These nonpolar waxes may be modified into alcohol waxes, for example, through an oxidation reaction so as to be polarized. The montan waxes are those each having a structure polarized, for example, through esterification or partial saponification. Examples of the plant waxes include carnauba wax, rice wax and candelilla wax, which each contain a mixture of esters of higher fatty acids and higher alcohols. Examples of the synthetic wax include fatty acids, fatty acid esters and fatty acid amides. Specific examples of the synthetic wax include castor oil, hardened castor oil, esters of adipic acid, phthalic acid, trimellitic acid and sebacic acid, 12-hydroxystearic acid, esters and amides of 12-hydroxystearic acid, and products obtained through saponification of 12-hydroxystearic acid.

These waxes are polar. Therefore, when any of these waxes is mixed with the polylactic acid, the transparency of the resin is maintained, so that the resulting resin composition is excellent in appearance.

Further, the polar wax is highly compatible with the biodegradable polyester resin and the phyllosilicate and, therefore, has a phyllosilicate dispersing effect.

The wax is immiscible with water and, therefore, is suitable for improving the gas barrier property. Further, the wax generally has a higher boiling point and, hence, is stable. Therefore, even if the wax is mixed with a resin which requires melt-kneading at a high temperature, the wax is stably present in the resin.

The amount of the polar wax to be blended is preferably 0.1 to 15 parts by mass, more preferably 0.5 to 10 parts by mass, based on 100 parts by mass of the biodegradable polyester resin. If the amount of the polar wax is less than 0.1 part by mass, it is difficult to provide the gas barrier property. If the amount of the polar wax is greater than 15 parts by mass, the matrix resin is liable to have deteriorated physical properties and suffer from molding failures and unsatisfactory kneading.

The jojoba oil to be employed in the second embodiment is an ester which is obtained by squeezing oil from seeds of natural jojoba and distilling the oil, and contains higher unsaturated fatty acids and higher unsaturated alcohols. The jojoba is an evergreen diclinous shrub naturally growing in dry areas in a US southwest region (Arizona, California) and a Mexico north region (Sonora, Baja) and generally having a height of 60 cm to 180 cm and sometimes having a height of 3 m. Currently, the jojoba is cultivated in dry areas in the United States and Mexico as well as Israel, Australia and Argentine.

Specific examples of the jojoba oil to be used in the present invention include crude jojoba oil squeezed from the jojoba seeds as described above, refined jojoba oil obtained through molecular distillation, hydrogenated jojoba oil solidified by hydrogenating the refined jojoba oil, jojoba alcohol and jojoba cream. The jojoba oil may be used in any of these forms, as long as it can be mixed with the resin. The refined jojoba oil is particularly preferred in order to keep the transparency of the resin composition as high as possible.

The jojoba oil is immiscible with water and, therefore, is suitable for improving the gas barrier property. Further, the jojoba oil has a very high boiling point (420° C.) and, hence, is stable. Therefore, even if the jojoba oil is mixed with a resin which requires melt-kneading at a high temperature, the jojoba oil is stably present in the resin. Further, the jojoba oil is highly compatible with the phyllosilicate and the biodegradable polyester resin and, therefore, is suitable for improving the dispersibility of the phyllosilicate in the aliphatic polyester.

The amount of the jojoba oil to be blended is preferably 0.1 to 15 parts by mass, more preferably 0.5 to 10 parts by mass, further more preferably 0.5 to 8 parts by mass, based on 100 parts by mass of the biodegradable polyester resin. If the amount of the jojoba oil is less than 0.1 part by mass, it is difficult to provide the barrier property. If the amount of the jojoba oil is greater than 15 parts by mass, the matrix resin is liable to suffer from deterioration in physical properties and moldability.

In the present invention, the polar wax and the jojoba oil may be employed in combination. Further, the polyether phosphate compound, the polar wax and the jojoba oil may be employed in any combination.

In the first embodiment, the resin composition preferably has a haze not higher than 35% as measured on a 1-mm thick piece molded from the resin composition. If the haze is higher than this level, the resulting product is liable to have a reduced transparency and/or relatively large agglomerates and, therefore, have a reduced commercial value. The haze is herein defined as turbidity measured by a turbidity meter. A higher haze indicates a higher turbidity, and a lower haze indicates a higher transparency and a lower turbidity. The haze is preferably not higher than 30%, more preferably not higher than 25%, most preferably not higher than 20%.

In the second embodiment, the resin composition containing the polar wax is excellent in transparency and phyllosilicate dispersibility, so that the resulting product has an excellent appearance with a haze not higher than 60% as measured on a 1-mm thick piece molded from the resin composition. If the haze is higher than this level, the transparency is unsatisfactory. Even if the haze is not much higher than this level, the resulting product has a reduced commercial value with relatively large agglomerates. Therefore, the haze is preferably not higher than 60% as described above, more preferably not higher than 55%, further more preferably not higher than 50%, as measured on the 1-mm thick piece.

In the second embodiment, the resin composition containing the jojoba oil has a haze not higher than 40% as measured on a 1-mm thick piece molded from the resin composition. The haze is preferably not higher than 40% as described above, more preferably not higher than 35%, further more preferably not higher than 30%, most preferably not higher than 25%, as measured on the 1-mm thick piece.

In the second embodiment, the biodegradable resin composition preferably has an oxygen permeation coefficient not greater than 150 ml·mm/m$^2$·day·MPa, more preferably not greater than 120 ml·mm/m$^2$·day·MPa, as measured at a temperature of 20° C. at a relative humidity of 90%.

The biodegradable polyester resin may contain at least one compound selected from the group consisting of a carbodiimide compound, an epoxy compound, an isocyanate compound and an oxazoline compound for blocking terminal groups of the biodegradable polyester resin for improvement of hydrolysis resistance. Among these compounds, the carbodiimide compound is preferred. The total amount of these compounds to be blended is preferably 0.1 to 5 parts by mass, more preferably 0.5 to 2 parts by mass, based on 100 parts by mass of biodegradable polyester resin.

Specific examples of the carbodiimide compound include: monocarbodiimides and aliphatic polycarbodiimides such as N,N'-di-2,6-diisopropylphenylcarbodiimide (available under the trade name of STABAKSOL I from Sumitomo Bayer Corporation), N,N'-di-o-tolylcarbodiimide, N,N'-diphenylcarbodiimide, N-tolyl-N'-cyclohexylcarbodiimide, diisopropylcarbodiimide, dimethylcarbodiimide and diisobutylcarbodiimde; and aromatic polycarbodiimides (for example, available under the trade name of STABAKSOL P from Sumitomo Bayer Corporation). These carbodiimide compounds may be used either alone or in combination. Among these carbodiimide compounds, N,N'-di-2,6-diisopropylphenylcarbodiimide is particularly preferred.

Specific examples of the epoxy compound include ethylene glycol diglycidyl ether, polyethylene glycol diglycidyl ether, propylene glycol diglycidyl ether, polypropylene glycol diglycidyl ether, polybutadiene diglycidyl ether, neopentylglycol diglycidyl ether, 1,6-hexanediol diglycidyl ether, cyclohexanedimethanol diglycidyl ether, hydroquinone diglycidyl ether, N-glycidyl phthalimide, hydrogenated bisphenol A-diglycidyl ether, sorbitol polyglycidyl ether, pentaerythritol polyglycidyl ether, glycerol polyglycidyl ether, polyglycerol polyglycidyl ether, trimethylpropane polyglycidyl ether, 2-ethylhexyl glycidyl ether, phenyl glycidyl ether, phenyl(polyethylene glycol) glycidyl ether, phenyl(polypropylene glycol) glycidyl ether, p-tert-butylphenyl glycidyl ether, diglycidyl-o-phthalate, diglycidyl terephthalate, dibromophenyl glycidyl ether, epoxylated plant oil, and polymers each having a glycidyl group at its side chain. These epoxy compounds may be used either alone or in combination. Among these epoxy compounds, ethylene glycol diglycidyl ether and polyethylene glycol diglycidyl ether are particularly preferred.

Specific examples of the isocyanate compound include hexamethylene diisocyanate, 2,4-tolylene diisocyanate, 2,6-tolylene diisocyanate, xylylene diisocyanate and diphenylmethane diisocyanate. These isocyanate compounds may be used either alone or in combination. Among these isocyanate compounds, hexamethylene diisocyanate is particularly preferred.

Specific examples of the oxazoline compound include: monooxazoline compounds such as 2-methyl-2-oxazoline, 2-ethyl-2-oxazoline, 2-phenyl-2-oxazoline, 2-isopropenyl-2-oxazoline and 2,4-dimethyl-2-oxazoline; bisoxazoline compounds such as 2,2'-(1,3-phenylene)bis(2-oxazoline); and polymers each having an oxazoline group at its side chain. These oxazoline compounds may be used either alone or in combination. Among these oxazoline compounds, 2,2'-(1,3-phenylene)bis(2-oxazoline) is particularly preferred.

The inventive resin composition may contain a phosphite compound or a phosphonite compound for improvement of colorlessness. Specific examples of the phosphite compound and the phosphonite compound include tetrakis(2,4-di-tert-butylphenyl)[1,1-biphenyl]-4,4'-diylbisphosphonite (available under the trade name of IRGAFOS P-EPQ from Ciba Specialty Chemicals Inc.), 3,9-bis(p-nonylphenoxy)-2,4,8,10-tetraoxa-3,9-diphosphaspiro[5,5]undecane (available under the trade name of ADEKA STAB PEP-4C from Adeka Corporation), O,O'-dialkyl($C_8$ to $C_{18}$)pentaerythritoldiphosphites (available under the trade name of ADEKA STAB PEP-8, PEP-8W from Adeka Corporation), a compound available under the trade name of ADEKA STAB PEP-11C from Adeka corporation though its correct name of the compound is not known to the inventor of the present invention, bis(2,4-di-tert-butylphenyl)pentaerythritoldiphosphite (available under the trade name of ADEKA STAB PEP24G from Adeka Corporation), bis(2,6-di-tert-butyl-4-methylphenyl)pentaerythritol diphosphite (available under the trade name of ADEKA STAB PEP36, PEP-36Z from Adeka Corporation), tris(2,4-di-tert-butylphenyl)phosphite (available under the trade name of 2112 from Adeka Corporation), and a hydrogenated bisphenol A-pentaerythritolphosphite polymer (available under the trade name of JPH3800 from Johoku Chemical Co., Ltd.). Among these compounds, bis(2,4-di-tert-butylphenyl)pentaerythritoldiphosphite (trade name: PEP24G), bis(2,6-di-tert-butyl-4-methylphenyl)pentaerythritol diphosphite (trade name: PEP36, PEP-36Z), tris(2,4-di-tert-butylphenyl)phosphite (trade name: 2112) and the hydrogenated bisphenol A-pentaerythritolphosphite polymer (trade name: JPH3800) are preferred.

Where the phosphite compound and/or the phosphonite compound are blended, the total amount of the compounds to be blended are preferably 0.1 to 5 parts by mass, more preferably 0.1 to 2 parts by mass, based on 100 parts by mass of the biodegradable polyester resin. These compounds may be used either alone or in combination.

For the inventive resin composition, at least one compound selected from the group consisting of the carbodiimide compound, the epoxy compound, the isocyanate compound and the oxazoline compound is preferably employed in combination with the phosphite compound or the phosphonite compound. By employing these compounds in combination, the hydrolysis resistance provided by the blocking of the terminal groups of the former compound can be improved. The mass ratio between at least one compound selected from the group consisting of the carbodiimide compound, the epoxy compound, the isocyanate compound and the oxazoline compound and the phosphite compound or the phosphonite compound to be employed in combination is preferably 1/0.002 to 1/200, more preferably 1/0.01 to 1/50.

In production of the inventive resin composition, the phyllosilicate is added to the biodegradable resin during polymerization of the biodegradable resin, or during melt-kneading of the biodegradable resin, or during molding of the biodegradable resin. At this time, a so-called master batch method may be employed, in which pellets preliminarily prepared as containing the phyllosilicate in a high concentration are added. The addition is preferably effected during the melt-kneading or during the molding. Where the addition is effected during the melt-kneading or during the molding, the phyllosilicate is preliminarily dry-blended with the resin, and the resulting blend is supplied to an ordinary kneading machine or a molding machine. Alternatively, the phyllosilicate may be supplied from a side feeder during the kneading.

In the production of the inventive resin composition, the addition of the polyether phosphate compound may be achieved by melt-kneading the biodegradable polyester resin and the polyether phosphate compound by means of an ordinary kneading machine, by blending a predetermined amount of the polyether phosphate compound with monomers of the biodegradable polyester and polymerizing the monomers to provide the biodegradable polyester resin composition, or by adding the polyether phosphate compound during molding of the biodegradable polyester resin. Among these methods, the first method is preferred, because reduction in the molecular weight of the polyester resin is suppressed and the addition is facilitated. At this time, a so-called master batch method may be employed, in which pellets preliminarily prepared as containing the polyether phosphate compound in a high concentration are added. Where the addition is effected during the melt-kneading or during the molding, the polyether phosphate compound is preliminarily dry-blended with the resin, and the resulting blend is supplied to an ordinary kneading machine or a molding machine. Alternatively, the polyether phosphate compound may be supplied from a metering pump during the kneading.

Where the metering pump is employed for the addition of the polyether phosphate compound, for example, the polyether phosphate compound may be diluted with or dissolved in a solvent for improvement of operability, as long as the effects of the invention are not impaired. The solvent is not particularly limited, but an ordinary solvent may be employed. However, a plasticizer highly compatible with the biodegradable resin employed in the present invention is preferably employed as the solvent, and the plasticizer is preferably biodegradable. For example, the plasticizer may be at least one plasticizer selected from aliphatic polycarboxylate derivatives, aliphatic polyalcohol ester derivatives, aliphatic oxyester derivatives, aliphatic polyether derivatives and aliphatic polyether polycarboxylate derivatives. Specific examples of these compounds include dimethyl adipate, dibutyl adipate, triethylene glycol diacetate, methyl acetylricinoleate, acetyl tributyl citrate, polyethylene glycol, dibutyl succinate, dioctyl succinate and dibutyl diglycol succinate. The amount of the plasticizer to be used is preferably not greater than 30 parts by mass, more preferably 0.1 to 20 parts by mass, based on 100 parts by mass of the resin.

For further improvement of the dispersibility of the phyllosilicate in the resin, magnesium stearate, an ester obtained by partial saponification of montanic acid or a plant-based oil may be added to the resin. Further, a polar group may be introduced into the resin by modifying the resin with maleic anhydride.

In the production of the inventive resin composition, the polar wax and/or the jojoba oil may be added to the biodegradable polyester resin during the polymerization of the resin, during the melt-kneading of the resin, or during the molding of the resin. At this time, a so-called master batch method may be employed, in which pellets preliminarily prepared as containing the polar wax and/or the jojoba oil in a high concentration are added. The addition is preferably effected during the melt-kneading or during the molding. Where the addition is effected during the melt-kneading or during the molding, the polar wax and/or the jojoba oil is preliminarily dry-blended with the resin, and the resulting blend is supplied to an ordinary kneading machine or a molding machine. Alternatively, the polar wax and/or the jojoba oil may be supplied from a side feeder during the kneading.

For the melt-kneading, an ordinary kneader such as a single screw extruder, a twin screw extruder, a roll kneader or a Brabender is employed. Among these, the twin screw extruder is preferably used for improvement of the dispersibility of the additives.

A heat stabilizer, an antioxidant, a pigment, a weather resistant agent, a flame retarder, a plasticizer, a lubricant, a mold release agent, an antistatic agent, a filler, a dispersant and the like other than the ingredients specified by the present invention may be added to the inventive biodegradable resin composition, as long as the effects of the present invention are not impaired. Examples of the heat stabilizer and the antioxidant include hindered phenol compounds, benzotriazole compounds, triazine compounds, hindered amine compounds, sulfur compounds, copper compounds, halides of alkali metals, and mixtures of any of these compounds. These additives are typically added during the melt-kneading or during the polymerization.

Examples of the filler include inorganic fillers and organic fillers. Examples of the inorganic fillers include talc, calcium carbonate, zinc carbonate, warrastonite, silica, alumina, magnesium oxide, calcium silicate, sodium aluminate, calcium aluminate, magnesium silicate, glass balloon, carbon black, zinc oxide, antimony trioxide, zeolites, hydrotalcite, metal fibers, metal whiskers, ceramic whiskers, potassium titanate, boron nitride and glass fibers. Examples of the organic fillers include graphite, carbon fibers, fullerene, carbon nano-tube, naturally existing polymers such as starch, polysaccharides, cellulose particles, wood powder, bean curd refuse, chaff, wheat bran and kenaf, and products obtained by modifying any of these polymers.

A non-biodegradable resin such as polyamide (nylon), polyethylene, polypropylene, polybutadiene, polystyrene, an AS resin, an ABS resin, polyoxymethylene, a polycycloolefin resin, poly(acrylic acid), poly(acrylate), poly(methacrylic acid), poly(methacrylate), polyethylene terephthalate, polytrimethylene terephthalate, polybutylene terephthalate, polyethylene naphthalate, polycarbonate or polyarylate, or a copolymer of any of these polymers may be added to the inventive biodegradable resin composition, as long as the effects of the present invention are not impaired.

The inventive resin composition is molded or formed into a variety of products by a known molding/forming method such as an injection molding method, a blowing method or an extrusion method.

An ordinary injection molding method as well as a gas injection molding method and an injection press molding method may be employed as the injection molding method. A cylinder temperature for the injection molding should be not lower than the melting point (Tm) or the fluidization starting temperature of the resin composition and, where the biodegradable polyester resin is the polylactic acid, the cylinder temperature is preferably 180 to 230° C., more preferably 190 to 220° C. If the molding temperature is too low, short molding and overload of the molding machine are liable to occur due to reduction in the fluidity of the resin. On the other hand, if the molding temperature is too high, the resin composition will be decomposed and, therefore, the resulting molded product will suffer from reduction in strength or colorization. Where the temperature of a mold is set at not higher than the glass transition temperature (Tg) of the resin composition, the mold temperature is preferably not higher than (Tg−10)° C. In order to promote the crystallization of the resin for improving the rigidity and the heat resistance of the molded product, the mold temperature may be kept at a temperature not lower than Tg and not higher than (Tm−30)° C.

Examples of the blowing method include a direct blowing method in which a product is molded directly from material chips, an injection blow molding method in which a preform (bottomed parison) prepared by injection molding is blow-molded, and a draw blow molding method. Further, a hot parison method in which a preform is blow-molded immediately after preparation of the preform, or a cold parison method in which a preform is once cooled, then demolded, and reheated to be blow-molded may be employed.

A T-die method or a circular die method may be employed as the extrusion method. An extrusion temperature should be not lower than the melting point (Tm) or the fluidization starting temperature of the resin composition material and, where the biodegradable resin is the polylactic acid, the extrusion temperature is preferably in the range of 180° C. to 230° C., more preferably in the range of 190° C. to 220° C. If the extrusion temperature is too low, the extrusion is liable to be unstable and suffer from overload. On the other hand, if the extrusion temperature is too high, the resin composition will be decomposed, and the resulting product will suffer from reduction in strength and colorization. Sheets, pipes and the like are produced by the extrusion method.

Specific examples of applications of the sheets and the pipes produced by the extrusion include material sheets for deep drawing, material sheets for batch foaming, cards such as credit cards, desk pads, clear files, straws and agricultural/horticultural rigid pipes. Further, the sheets may be deep-drawn by vacuum forming, air pressure forming or vacuum air pressure forming for production of food containers, agricultural and horticultural containers, blister packages, press-through packages and the like. A deep-drawing temperature and a heat treatment temperature are preferably (Tg+20)° C. to (Tg+100)° C. If the deep-drawing temperature is lower than (Tg+20)° C., the deep drawing is difficult. On the other hand, if the deep-drawing temperature is higher than (Tg+100)° C., the resin composition will be decomposed, resulting in uneven wall thickness and disorientation of the resin. The disorientation of the resin reduces the impact resistance. The shapes of the food containers, the agricultural and horticultural containers, the blister packages and the press-through packages are not particularly limited, but these deep-drawn containers preferably each have a depth of not less than 2 mm for containing food, goods, drugs and the like. Further, the wall thicknesses of the containers are not particularly limited, but preferably not less than 50 μm, more preferably 150 to 500 μm, for strength. Specific examples of the food containers include fresh food trays, instant food containers, fast food containers and lunch boxes. Specific examples of the agricultural and horticultural containers include seeding pots. Specific examples of the blister packages include packages and containers for food and other various commodities including stationery, toys, dry batteries and the like.

Other exemplary products produced from the inventive resin composition include: tableware such as dishes, bowls, pots, chopsticks, spoons, forks and knives; containers for fluids; container caps; stationery such as rulers, writing utensils, clear cases and CD cases; daily commodities such as sink corner strainers, trash boxes, washbowls, tooth brushes, combs and hangers; toys such as plastic models; electrical appliance resin components such as air conditioner panels and housings; and automotive resin components such as bumpers, interior panels and door trims.

The shapes of the fluid containers are not particularly limited, but the containers preferably each have a depth of not less than 20 mm for containing fluids. The wall thicknesses of the containers are not particularly limited, but preferably not less than 0.1 mm, more preferably 0.1 to 5 mm, for strength. Specific examples of the fluid containers include: drinking cups and beverage bottles for milk beverages, cold beverages and alcoholic beverages; temporary storage containers for seasonings such as soy sauce, sauce, mayonnaise, ketchup and cooking oil; containers for shampoo and rinse; cosmetic containers; and agricultural containers.

A product molded or formed from the inventive resin composition may be heat-treated for promoting crystallization of the resin. Thus, the product is imparted with improved heat resistance and gas barrier property. The temperature for the heat treatment is preferably in a range not lower than Tg and not higher than Tm.

Filaments can also be produced from the inventive resin composition. The production method for the filaments is not particularly limited, but the filaments are preferably produced by melt-spinning of the resin composition followed by drawing. A melt-spinning temperature is preferably 160° C. to 260° C. If the melt-spinning temperature is lower than 160° C., melt-extrusion tends to be difficult. On the other hand, if the melt-spinning temperature is higher than 260° C., the resin composition tends to suffer from remarkable decomposition, making it difficult to provide highly strong filaments. The filaments produced by the melt-spinning may be drawn to an intended filament diameter at a temperature not lower than Tg.

The filaments produced by the aforesaid method are used for fibers for garments, industrial materials and staple fiber nonwoven fabrics.

A filament nonwoven fabric can also be produced from the inventive biodegradable resin composition. A production method for the filament nonwoven fabric is not particularly limited, but the production may be achieved by spinning filaments from the resin composition by a high speed spinning method, depositing the filaments into a web, and heat-pressing the web into a fabric.

EXAMPLES

The present invention will hereinafter be described in detail by way of examples thereof. However, the present invention is not limited to the following examples.

Measurement and Evaluation Methods (1) Haze

The haze of a 1-mm thick press sheet was measured in conformity with JIS K-7136. More specifically, a resin composition was pressed at 190° C. for about three minutes by means of a desk-top test press available from Tester Industries Corporation to provide a 1-mm thick press sheet. The measurement was performed on the press sheet by means of a turbidity/haze meter NDH-2000 available from Nippon Denshoku Industries Co., Ltd.

(2) Agglomeration (Transparency)

A 1-mm thick piece molded from a resin composition was visually checked. A molded piece containing a lot of agglomerates was rated as unacceptable (x), and a molded piece containing substantially no agglomerate was rated as good (○). A molded piece containing no agglomerate was rated as excellent (◎).

(3) Flexural Modulus and Flexural Strength

A resin composition was injection-molded into a test piece having a size of 127 mm×13 mm×3 mm. The flexural modulus and the flexural strength of the test piece were measured by applying a load at a deformation rate of 1 mm/min in conformity with ASTM-790. The test piece was prepared under the following preparation or injection molding conditions:

The test piece was injection-molded by means of an injection molding machine (Model IS-80G available from Toshiba Machine Co., Ltd.) with the use of a mold for a ⅛-inch three-point flexure dumbbell test specimen specified by ASTM by employing a cylinder temperature of 190 to 170° C., a mold temperature of 15° C., an injection pressure of 60%, an injection period of 20 seconds, a cooling period of 20 seconds and an interval of 2 seconds.

(4) Hydrolysis Resistance

A test piece molded in the aforesaid manner (3) was stored at a temperature of 60° C. at a relative humidity of 90% for 300 hours in a constant temperature and constant humidity oven (available from Yamato Scientific Co., Ltd.) and then the flexural strength of the test piece was measured in the aforesaid manner (3) for evaluation.

A strength retention ratio (%) was calculated from the following expression:

$$\text{Strength retention ratio} = \frac{\text{Strength after storage}}{\text{Strength before storage}} \times 100$$

(5) Yellowing Index (YI)

Measurement was performed on pellets each having a size of 1.5 mm×3 mm square and filled in a glass cell having a size of 12 mm×30 mmφ by means of a color meter Z-Σ90 available from Nippon Denshoku Industries Co., Ltd. A lower yellowing index indicates a reduced yellowish tint and an excellent colorlessness.

(6) Gas Barrier Property (Oxygen Permeation Coefficient)

The oxygen permeability of a sheet (having a thickness of 200 to 300 μm) produced by thermally pressing a resin composition with its moisture content properly conditioned was measured at a temperature of 20° C. at a relative humidity of 90% by a differential pressure method by means of a differential pressure gas permeability analyzer (GTR-30XAU available from Yanaco Analytical Systems Inc.) Oxygen permeability values taken after a lapse of 0.5 hour, 1 hour and 2 hours from the start of the measurement were employed. The oxygen permeation coefficient was calculated from the following expression:

Oxygen permeation coeffiecent=Oxygen permeability×Sample thickness

The oxygen permeation coefficient is an index of the gas barrier property. A smaller oxygen permeation coefficient indicates a more excellent gas barrier property.

(7) Evaluation of Bottle Blow-Moldability

An attempt was made to produce a bottle by blow-molding a resin composition in a high-temperature mold kept at 125° C. A resin composition with the attempt succeeded was rated as good (○), and a resin composition with the attempt failed was rated as unacceptable (x).

(8) Melt Flow Rate (MFR)

The melt flow rate was measured under conditions specified by Table 1 of Appendix A (at 190° C. with 21.2 N) in JIS K7210.

Ingredients

Ingredients employed in the following examples and comparative examples were shown below.

(1) Biodegradable Polyester Resins

Resin A: A polylactic acid (available under the trade name of Nature Works 4032D from Cargill Dow Corporation, and having a weight average molecular weight (Mw) of 180,000, a melting point of 170° C., a D-lactic acid content of 1.4% by mole, and an MFR of 5 g/10 min.

Resin B: A lactic acid/dimer acid/propylene glycol copolymer (prepared by copolymerizing L-lactide with a polyester synthesized from propylene glycol and a dimer acid (a dimer of a partially hydrogenated aliphatic unsaturated $C_{18}$ carboxylic acid available under the trade name of EMPOL 1062 from Cognis Ltd.). The resin B was synthesized in the following manner.

Preparation Method for Resin B

In a 50-liter reaction vessel fitted with a stirrer, a condenser and a gas introduction pipe, 1 mole equivalent of EMPOL 1062 and 1.4 mol equivalents of polypropylene glycol were charged. The resulting mixture was stirred in a stream of nitrogen while being heated from 150° C. at a temperature increasing rate of 10° C./hour. The mixture was heated up to 220° C., while the resulting water is distilled away. After a lapse of two hours, 70 ppm of titanium tetrabutoxide was added as an ester exchange catalyst to the mixture, which was in turn stirred for one hour at a pressure reduced to 0.1 kPa. Thus, an aliphatic polyester was provided, which had a number average molecular weight (Mn) of 14,000 as determined on the basis of polystyrene calibration standards with the use of a GPC and a weight average molecular weight (Mw) of 23,000. Then, 20 parts by mass of the aliphatic polyester and 80 parts by mass of L-lactide were put in 15 parts by mass of toluene based on the total of 100 parts by mass of the L-lactide and the polyester in a separable flask, and melted at 175° C. After the resulting melt was homogenized, 500 ppm of titanium bisacetylacetonate was added to the melt, and the resulting melt was stirred at 175° C. for seven hours. Thus, the resin B was provided, which had a number average molecular weight (Mn) of 40,000 as determined on the basis of polystyrene calibration standards with the use of the GPC and a weight average molecular weight (Mw) of 73,000. The resin B had a lactic acid content of 68% by mass.

Resin C: A polylactic acid (available under the trade name of Nature Works from Cargill Dow Corporation, and having a weight average molecular weight (Mw) of 130,000, a melting point of 170° C., a D-lactic acid content of 1.3% by mole, an MFR of 7.3 g/10 min.

(3) Phyllosilicates

SOMASIF MEE: A synthetic swellable fluorinated mica with its interlayer ions replaced with dihydroxyethylmethyldodecylammonium ions (available from Coop Chemical Co., Ltd., and having an average particle diameter of 6.2 μm)

SOMASIF MTE: A synthetic swellable fluorinated mica with its interlayer ions replaced with methyltrioctylammonium ions (available from Coop Chemical Co., Ltd.)

ESBEN W: A montmorillonite with its interlayer ions replaced with dioctadecyldimethylammonium ions (available from Hojun Co., Ltd.)

LUCENTITE SAN: A synthetic swellable hectorite with its interlayer ions replaced with dimethyldioctadecylammonium ions (available from Coop Chemical Co., Ltd.)

Lactide-intercalated phyllosilicate MLE: A lactide-intercalated phyllosilicate prepared by mixing 100 g of a synthetic swellable fluorinated mica (SOMASIF MEE) having interlayer ions replaced with dihydroxyethylmethyldodecylammonium ions and 25 g of L-lactide (available from Musashino Chemical Laboratory, Ltd.) for 48 hours by means of a ball mill, and having an interlayer distance of 2.9 nm.

(3) Polyether Phosphate Compounds

DA375: Available under the trade name of DISPARLON DA375 from Kusumoto Chemicals, Ltd.

A215C: Available under the trade name of PLYSURF A215C from Daiichi Kogyo Seiyaku Co., Ltd.

(4) Polar Waxes

Polar Wax D: Alcohol wax (OX1949 available from Nippon Seiro Co., Ltd.)

Polar Wax E: Oxidized wax (LUVAX0321 available from Nippon Seiro Co., Ltd.)

Polar Wax F: Dibutyl sebacate (DBS available from Hokoku Corporation)

Polar Wax G: Dioctyl sebacate (DOS available from Hokoku Corporation)

Non-polar Wax H: Paraffin wax (Parrafin 155 available from Nippon Seiro Co., Ltd.)

(5) Jojoba Oil

Jojoba oil I: Refined jojoba oil (available from Koei Kogyo Co., Ltd.)

(6) Carbodiimide Compound

CDI: N,N'-di-2,6-diisopropylphenylcarbodiimide (Stabaksol I Available from Bayer Corporation)

(7) Antioxidants (Phosphite Compounds)

PEP-36 (phosphite antioxidant): Bis(2,6-di-tert-butyl-4-methylphenyl)pentaerythritol diphosphite (ADEKA STAB PEP-36 available from Adeka Corporation)

JPH-3800 (phosphite antioxidant): A hydrogenated bisphenol A-pentaerythritolphosphite polymer (available from Johoku Chemical Co., Ltd.)

(8) Diluent

ATBC: Acetyl tributyl citrate (available from Taoka Chemical Co., Ltd.)

Example 1

First, 100 parts by mass of Resin A, 4 parts by mass of MEE and 0.5 parts by mass of DA375 were dry-blended, and then the resulting blend was fed into a twin screw extruder PCM-30 available from Ikegai Co., Ltd. (having a screw diameter of 30 mmφ and an average channel depth of 2.5 mm). The blend was melt-kneaded at a cylinder temperature of 190° C. with a screw rotation speed of 200 rpm (=3.3 rps) with a retention time of 1.6 minutes, and extruded into strands, which were in turn cut into pellets. Thus, a pellet-shaped resin composition was prepared.

Results of evaluation of a product molded from the resin composition are shown in Table 1.

Results of the evaluation of products molded from the aforementioned resin compositions are shown in Table 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Formulation | | | | | | | | | | |
| Resin | Type | A | A | A | A | A | A | A | A | A |
| | Parts by mass | 100 | 100 | 100 | 100 | 100 | 100 | 100 | 100 | 100 |
| Phyllosilicate | Type | MEE | MEE | MEE | MEE | MEE | MTE | SBW | SBW | SAN |
| | Parts by mass | 4 | 4 | 4 | 4 | 10 | 4 | 4 | 4 | 10 |
| Polyether | Type | DA375 | DA375 | DA375 | DA375 | DA375 | A215C | DA375 | A215C | DA375 |
| Phosphate | Parts by mass | 0.5 | 0.5 | 0.5 | 0.5 | 4 | 1 | 2 | 2 | 4 |
| Other additives | Type | — | CDI/PEP-36 | CDI | PEP-36 | — | — | — | CDI/JPH-3800 | — |
| | Parts by mass | — | 2/0.5 | 2 | 0.5 | — | — | — | 2/0.25 | — |
| Results of evaluation of molded product | | | | | | | | | | |
| Haze | % | 29 | 28 | 32 | 33 | 33 | 33 | 31 | 30 | 25 |
| | Evaluation | ○ | ○ | ○ | ○ | ○ | ○ | ○ | ○ | ○ |
| | Agglomeration | ◎ | ◎ | ◎ | ◎ | ○ | ◎ | ○ | ○ | ○ |
| Physical properties | Flexural modulus (GPa) | 4.9 | 4.7 | 4.7 | 4.7 | 6.5 | 5.0 | 4.7 | 4.7 | 5.0 |
| | Flexural strength (MPa) | 120 | 116 | 121 | 124 | 91 | 125 | 113 | 118 | 100 |
| Hydrolysis resistance | Strength retention ratio (%) | 18 | 85 | 52 | 11 | 0 | 15 | 8 | 75 | 0 |
| | Yellowing index (YI) | 40 | 20 | 38 | 16 | 54 | 42 | 35 | 22 | 52 |

| | | Example | | Comparative Example | | | | | | |
|---|---|---|---|---|---|---|---|---|---|---|
| | | 10 | 11 | 1 | 2 | 3 | 4 | 5 | 6 | 7 |
| Formulation | | | | | | | | | | |
| Resin | Type | B | A | A | A | A | A | A | B | A |
| | Parts by mass | 100 | 100 | 100 | 100 | 100 | 100 | 100 | 100 | 100 |
| Phyllosilicate | Type | MEE | MEE | MEE | SBW | MEE | MTE | SAN | MEE | MLE |
| | Parts by mass | 4 | 4 | 4 | 4 | 10 | 4 | 10 | 4 | 4 |
| Polyether | Type | DA375 | DA375 | — | — | — | — | — | — | — |
| Phosphate | Parts by mass | 0.5 | 1 | 0 | 0 | 0 | 0 | 0 | 0 | 0 |
| Other additives | Type | — | CDI/JPH-3800/ATBC | — | — | — | — | — | — | — |
| | Parts by mass | — | 2/0.5/0.5 | — | — | — | — | — | — | — |
| Results of evaluation of molded product | | | | | | | | | | |
| Haze | % | 29 | 26 | 42 | 52 | 65 | 41 | 40 | 44 | 54 |
| | Evaluation | ○ | ○ | X | X | X | X | X | X | X |
| | Agglomeration | ◎ | ◎ | X | X | X | X | X | X | X |
| Physical properties | Flexural modulus (GPa) | 4.5 | 4.8 | 5.0 | 4.5 | 6.7 | 5.0 | 4.9 | 4.6 | 4.9 |
| | Flexural strength (MPa) | 90 | 118 | 114 | 113 | 92 | 123 | 102 | 92 | 120 |
| Hydrolysis resistance | Strength retention ratio (%) | 9 | 88 | 15 | 5 | 0 | 12 | 6 | 8 | 0 |
| | Yellowing index (YI) | 41 | 26 | 44 | 32 | 48 | 37 | 47 | 42 | 44 |

<Resins> Resin A: Polylactic acid, Resin B: Lactic acid/Dimer acid/propylene glycol copolymer
<Phyllosilicates> MEE: SOMASIF MEE, MTE: SOMASIF MTE, SBW: ESBEN W, SAN: LUCENTITE SAN, MLE: Lactide-intercalated phyllosilicate
<Polyether Phosphates> DA375: DISPARLON DA375, A215C: PLYSURF A215C
<Carbodiimide compound> CDI: N,N'-di-2,6-diisopropylphenylcarbodiimide
<Phosphite compounds> PEP-36: Bis(2,6-di-tert-butyl-4-methylphenyl)pentaerythritoldiphosphite JPH-3800: Hydrogenated bisphenol A-pentaerythritolphosphite polymer
<Diluent> ATBC: Acetyl tributyl citrate
<Evaluation of haze> Good (○, not higher than 35%), Unacceptable (X, higher than 35%)
<Evaluation of agglomeration> Excellent (◎, no agglomerate), Good (○, substantially no agglomerate), Unacceptable (X, a lot of agglomerates)

Examples 2 to 10 and Comparative Examples 1 to 7

Resin compositions were each prepared by melt-kneading in substantially the same manner as in Example 1, except that a resin, a phyllosilicate, a polyether phosphate compound and other additives as shown in Table 1 were employed. The other additives were simultaneously dry-blended with the resin, the phyllosilicate and the polyether phosphate compound before the mixture was fed into the extruder.

Example 11

First, 100 parts by mass of Resin A, 4 parts by mass of MEE, 2 parts by mass of CDI and 0.5 parts by mass of JPH-3800 were dry-blended, and then the resulting blend was fed into a twin screw extruder PCM-30 available from Ikegai Co., Ltd. (having a screw diameter of 30 mmφ and an average channel depth of 2.5 mm) and melt-kneaded at a cylinder temperature of 190° C. with a screw rotation speed of 200 rpm (=3.3 rps) with a retention time of 1.6 minutes. Then, a mixture containing DA375 and ATBC in a mass ratio of 1/0.5 was added to the blend in a DA375/Resin A mass ratio of 1/100 from a middle portion of the kneading machine by means of a metering pump. The resulting blend was extruded into strands, which were in turn cut into pellets. Thus, a pellet-shaped resin composition was prepared.

Results of evaluation of a product molded from the resin composition are shown in Table 1.

The resin compositions of Examples 1 to 11 each had a haze not higher than 35% with substantially no agglomerate.

Example 3, in which the carbodiimide compound was added, was excellent in hydrolysis resistance as compared with Example 1 in which the carbodiimide compound was not added.

Example 4, in which the phosphite compound was added, had a lower YI, and was excellent in colorlessness.

Examples 2, 8 and 11, in which the carbodiimide compound and the phosphite compound were employed in combination, were improved in hydrolysis resistance and colorlessness. Particularly, the hydrolysis resistance was significantly improved over Example 3 in which only the carbodiimide compound was added.

In contrast, Comparative Examples 1 to 7 had the following problems. Comparative Examples 1 to 7, in which the polyether phosphate was not contained, were unsatisfactory in phyllosilicate dispersibility, and each had a haze of 40% or higher. Further, a lot of agglomerates were visually observed.

Example 12

First, 100 parts by mass of Resin C, 4 parts by mass of MEE and 0.5 parts by mass of Polar wax D were dry-blended, and then the resulting blend was fed into a twin screw extruder PCM-30 available from Ikegai Co., Ltd. (having a screw diameter of 30 mm$\phi$ and an average channel depth of 2.5 mm). The blend was melt-kneaded at 190° C. with a screw rotation speed of 200 rpm (=3.3 rps) with a retention time of 1.6 minutes, and extruded into pellets, which were in turn dried. Thus, a resin composition was prepared. The resin composition thus prepared was formed into a press sheet, which was evaluated for haze, transparency and oxygen permeation coefficient.

Further, the resin composition was melted at a cylinder temperature of 200° C. and injected into a mold kept at 10° C. by means of an injection blow molding machine (ASB-50TH available from Nissei ASB Machine Co., Ltd.) and then cooled for 10 seconds. Thus, a 5-mm thick preform (bottomed parison) was provided. The parison was heated to 120° C. by an electric heater, then put in a high temperature mold kept at 125° C., and blown at an air pressure of 3.5 MPa. Thus, a bottle having a volume of 130 mL and a wall thickness of 1.1 mm was produced. This molding process was observed.

The results of the observation are shown in Table 2.

TABLE 2

| | | Example | | | | | | | | |
|---|---|---|---|---|---|---|---|---|---|---|
| | | 12 | 13 | 14 | 15 | 16 | 17 | 18 | 19 | 20 |
| Proportions of ingredients of resin composition | | | | | | | | | | |
| Biodegradable resin | Type | C | C | C | C | C | C | C | C | C |
| | Parts by mass | 100 | 100 | 100 | 100 | 100 | 100 | 100 | 100 | 100 |
| Phyllosilicate | Type | MEE | MEE | MEE | MEE | MEE | MTE | MTE | MEE | MEE |
| | Parts by mass | 4 | 4 | 4 | 4 | 8 | 4 | 8 | 4 | 4 |
| Wax | Type | D | D | D | D | D | D | D | E | F |
| | Parts by mass | 0.5 | 2 | 4 | 10 | 4 | 0.5 | 4 | 2 | 2 |
| Evaluation of appearance | | | | | | | | | | |
| Transparency | Haze (%) | 38 | 52 | 55 | 58 | 57 | 42 | 48 | 53 | 31 |
| | Agglomeration | No | No | No | No | Substantially no | No | Substantially no | No | No |
| | Evaluation | ◎ | ◎ | ◎ | ◎ | ○ | ◎ | ○ | ◎ | ◎ |
| Evaluation of gas barrier property | | | | | | | | | | |
| Oxygen permeation coefficient (ml · mm/m$^2$ · day · MPa) | | 105 | 98 | 82 | 75 | 50 | 89 | 61 | 80 | 85 |
| Moldability in high temperature mold | | ○ | ○ | ○ | ○ | ○ | ○ | ○ | ○ | ○ |

| | | Example | | Comparative Example | | | | | | |
|---|---|---|---|---|---|---|---|---|---|---|
| | | 21 | 22 | 8 | 9 | 10 | 11 | 12 | 13 | 14 |
| Proportions of ingredients of resin composition | | | | | | | | | | |
| Biodegradable resin | Type | C | C | C | C | C | C | C | C | C |
| | Parts by mass | 100 | 100 | 100 | 100 | 100 | 100 | 100 | 100 | 100 |
| Phyllosilicate | Type | MEE | MEE | MEE | MEE | MEE | MTE | SBW | — | MEE |
| | Parts by mass | 4 | 1 | 4 | 1 | 8 | 4 | 4 | 0 | 4 |
| Wax | Type | G | D | — | — | — | — | — | D | H |
| | Parts by mass | 2 | 1 | 0 | 0 | 0 | 0 | 0 | 4 | 2 |

TABLE 2-continued

| | | | | | | | | | | |
|---|---|---|---|---|---|---|---|---|---|---|
| | Evaluation of appearance | | | | | | | | | |
| Transparency | Haze (%)<br>Agglomeration<br>Evaluation | 29<br>No<br>◉ | 30<br>No<br>◉ | 50<br>A lot<br>X | 42<br>Yes<br>X | 63<br>A lot<br>X | 48<br>Yes<br>X | 35<br>Substantially no<br>○ | 44<br>No<br>◉ | 96<br>Whitened<br>X |
| | Evaluation of gas barrier property | | | | | | | | | |
| Oxygen permeation coefficient<br>(ml · mm/m² · day · MPa) | | 88 | 175 | 94 | 172 | 61 | 125 | 198 | 205 | 71 |
| Moldability in high temperature mold | | ○ | ○ | ○ | ○ | ○ | ○ | ○ | X | ○ |

<Resin> C: Polylactic acid
<Phyllosilicates> MEE: SOMASIF MEE, MTE: SOMASIF MTE, SBW: ESBEN W
<Polar waxes> D: OX1949 (Nippon Seiro's alcohol wax), E: LUVAX0321 (Nippon Seiro's oxidized wax), F: DBS (Hokoku's dibutyl sebacate), G: DOS (Hokoku's dioctyl sebacate)
<Non-polar wax> H: Parrafin 155 (Nippon Seiro's Paraffin wax)

Examples 13 to 22

Resin compositions were each prepared in substantially the same manner as in Example 12, except that the formulation was changed as shown in Table 2. The resin compositions were evaluated in the same manner as in Example 12. The results of the evaluation are shown in Table 2.

Comparative Example 8

A resin composition was prepared and molded in substantially the same manner as in Example 12, except that only the resin and the phyllosilicate were kneaded without addition of the polar wax. Then, the resulting molded product was evaluated. The results of the evaluation are shown in Table 2.

Comparative Examples 9 to 12

Resin compositions were each prepared and molded in substantially the same manner as in Comparative Example 8 without addition of the polar wax, except that the formulation was changed as shown in Table 2. Then, the resulting molded products were evaluated. The results of the evaluation are shown in Table 2.

Comparative Example 13

A resin composition was prepared and molded in substantially the same manner, except that only the resin and the polar wax were kneaded without addition of the phyllosilicate as shown in Table 2. Then, the resulting molded product was evaluated.

Comparative Example 14

A resin composition was prepared and molded in substantially the same manner as in Example 12, except that the non-polar wax was employed. Then, the resulting molded product was evaluated. The results of the evaluation are shown in Table 2.

The resin compositions of Examples 12 to 22 were excellent in appearance, gas barrier property and moldability. In contrast, none of the resin compositions of Comparative Examples 8 to 14 were excellent in all of appearance, gas barrier property and moldability.

Example 23

First, 100 parts by mass of Resin C, 2 parts by mass of MEE and 2 parts by mass of Jojoba oil I were dry-blended, and then the resulting blend was fed into a twin screw extruder PCM-30 available from Ikegai Co., Ltd. (having a screw diameter of 30 mmφ and an average channel depth of 2.5 mm). The blend was melt-kneaded at 190° C. with a screw rotation speed of 200 rpm (=3.3 rps) with a retention time of 1.6 minutes, and extruded into pellets, which were in turn dried. Thus, a resin composition was prepared. The resin composition thus prepared was formed into a press sheet, which was evaluated for haze, transparency and oxygen permeation coefficient.

Further, the resin composition was melted at a cylinder temperature of 200° C. and injected into a mold kept at 10° C. by means of an injection blow molding machine (ASB-50TH available from Nissei ASB Machine Co., Ltd.) and cooled for 10 seconds. Thus, a 5-mm thick preform (bottomed parison) was provided. The parison was heated to 120° C. by an electric heater, then put in a high temperature mold kept at 125° C., and blown at an air pressure of 3.5 MPa. Thus, a bottle having a volume of 130 mL and a wall thickness of 1.1 mm was produced. This molding process was observed.

The results of the observation are shown in Table 3.

TABLE 3

| | | Example | | | | | | |
|---|---|---|---|---|---|---|---|---|
| | | 23 | 24 | 25 | 26 | 27 | 28 | 29 |
| Proportions of ingredients of resin composition | | | | | | | | |
| Biodegradable resin | Type<br>Parts by mass | C<br>100 | C<br>100 | C<br>100 | C<br>100 | C<br>100 | C<br>100 | C<br>100 |
| Phyllosilicate | Type<br>Parts by mass | MEE<br>2 | MEE<br>4 | MEE<br>4 | MEE<br>4 | MEE<br>4 | MEE<br>8 | MTE<br>4 |
| Jojoba oil | Type<br>Parts by mass | I<br>2 | I<br>0.5 | I<br>2 | I<br>4 | I<br>10 | I<br>4 | I<br>0.5 |

TABLE 3-continued

| | | Appearance | | | | | | |
|---|---|---|---|---|---|---|---|---|
| Transparency | Haze (%) | 28 | 39 | 31 | 28 | 37 | 38 | 37 |
| | Agglomeration | No | Substantially no | No | No | No | No | Substantially no |
| | Evaluation | ◎ | ○ | ◎ | ◎ | ◎ | ◎ | ○ |
| | | Evaluation of gas barrier property | | | | | | |
| Oxygen permeation coefficient (ml·mm/m²·day·MPa) | | 142 | 90 | 88 | 73 | 65 | 51 | 95 |
| Moldability in high temperature mold | | ○ | ○ | ○ | ○ | ○ | ○ | ○ |

| | | Example | | | Comparative Example | | | | |
|---|---|---|---|---|---|---|---|---|---|
| | | 30 | 31 | 32 | 15 | 16 | 17 | 18 | 19 |
| | | Proportions of ingredients of resin composition | | | | | | | |
| Biodegradable resin | Type | C | C | C | C | C | C | C | C |
| | Parts by mass | 100 | 100 | 100 | 100 | 100 | 100 | 100 | 100 |
| Phyllosilicate | Type | MTE | SBW | MEE | MEE | MEE | MEE | MTE | — |
| | Parts by mass | 8 | 8 | 1 | 4 | 1 | 8 | 4 | 0 |
| Jojoba oil | Type | I | I | I | — | — | — | — | I |
| | Parts by mass | 4 | 4 | 1 | 0 | 0 | 0 | 0 | 4 |
| | | Appearance | | | | | | | |
| Transparency | Haze (%) | 36 | 39 | 25 | 50 | 42 | 63 | 48 | 25 |
| | Agglomeration | No | No | No | A lot | Yes | A lot | Yes | No |
| | Evaluation | ◎ | ◎ | ◎ | X | X | X | X | ◎ |
| | | Evaluation of gas barrier property | | | | | | | |
| Oxygen permeation coefficient (ml·mm/m²·day·MPa) | | 66 | 145 | 170 | 94 | 172 | 61 | 125 | 205 |
| Moldability in high temperature mold | | ○ | ○ | ○ | ○ | ○ | ○ | ○ | X |

<Resin> C: Polylactic acid
<Phyllosilicates> MEE: SOMASIF MEE, MTE: SOMASIF MTE, SBW: ESBEN W
<Jojoba oil> I: Refined jojoba oil Examples 24 to 32

Resin compositions were each prepared in substantially the same manner as in Example 23, except that the formulation was changed as shown in Table 3. The resulting products were evaluated in the same manner as in Example 23. The results of the evaluation are shown in Table 3.

Comparative Examples 15 and 18

Resin compositions were each prepared and molded in substantially the same manner as in Example 24, except that only the resin and the phyllosilicate were kneaded without addition of the refined jojoba oil. Then, the resulting molded products were evaluated. The results of the evaluation are shown in Table 3.

Comparative Examples 16 and 17

Resin compositions were each prepared and molded in substantially the same manner as in Comparative Example 15 without addition of the refined jojoba oil, except that the formulation was changed as shown in Table 3. Then, the resulting molded products were evaluated. The results of the evaluation are shown in Table 3.

Comparative Example 19

A resin composition was prepared and molded in substantially the same manner, except that only the resin and the jojoba oil were kneaded without addition of the phyllosilicate as shown in Table 3. Then, the resulting molded product was evaluated. The results of the evaluation are shown in Table 3.

The resin compositions of Examples 23 to 32 were excellent in transparency and gas barrier property, and moldable in the high temperature mold. In contrast, none of the resin compositions of Comparative Examples 15 to 19 were excellent in both transparency and gas barrier property.

What is claimed is:

1. A biodegradable polyester resin composition comprising:
   a biodegradable polyester resin including one selected from the group consisting of an α-hydroxycarboxylic acid unit, a β-hydroxycarboxylic acid unit, an α-hydroxycarboxylic acid unit and a β-hydroxycarboxylic acid unit, and an ω-hydroxyalkanoate unit as a major component thereof;
   a phyllosilicate; and
   a jojoba oil.

2. A biodegradable polyester resin composition as set forth in claim 1, wherein the jojoba oil is present in a proportion of 0.1 to 15 parts by mass based on 100 parts by mass of the biodegradable polyester resin.

3. A biodegradable polyester resin composition as set forth in claim 1, which has a haze not higher than 40% as measured on a 1-mm thick piece molded from the biodegradable polyester resin composition, and has an oxygen permeation coefficient not greater than 150 ml·mm/m²·day·MPa as measured at a temperature of 20° C. at a relative humidity of 90%.

4. A biodegradable polyester resin composition as set forth in claim 1, wherein the biodegradable polyester resin comprises not less than 50% by mass of a polylactic acid per total mass of the biodegradable polyester resin.

5. A biodegradable polyester resin composition as set forth in claim 1, wherein the phyllosilicate is present in a proportion of 0.5 to 10 parts by mass based on 100 parts by mass of the biodegradable polyester resin.

6. A production method for a biodegradable polyester resin composition as recited in claim 1, comprising the step of:
adding a phyllosilicate and a jojoba oil to the biodegradable polyester resin during melt-kneading or molding.

7. A product molded or formed from a biodegradable polyester resin composition as recited in claim 1.

8. A biodegradable polyester resin composition as set forth in claim 1, wherein the phyllosilicate contains an ion bonded between layers thereof, the ion being at least one selected from the group consisting of primary to quaternary ammonium, pyridinium, imidazolium and phosphonium ions.

9. A biodegradable polyester resin composition as set forth in claim 1, further comprising 0.1 to 5 parts by mass of at least one compound selected from the group consisting of a carbodiimide compound, an epoxy compound, an isocyanate compound and an oxazoline compound based on 100 parts by mass of the biodegradable polyester resin.

10. A biodegradable polyester resin composition as set forth in claim 1, further comprising 0.1 to 5 parts by mass of one selected from the group consisting of a phosphite compound and a phosphonite compound based on 100 parts by mass of the biodegradable polyester resin.

* * * * *